United States Patent [19]

Sato et al.

[11] Patent Number: 6,011,131
[45] Date of Patent: Jan. 4, 2000

[54] PROCESS FOR THE PREPARATION OF POLYAMIDES

[75] Inventors: Setsuo Sato, Sao Paulo, Brazil; Hercules Peloggia, Sao Paulo, Brazil; Tracy Hunt, Kankakee, Ill.; Joerg Schwarzer, Hilden, Germany; Ramiro Carielo Bueno, San Paulo, Brazil; Roger A. Lovald, Amery, Wis.

[73] Assignee: Henkel Corporation, Gulph Mills, Pa.

[21] Appl. No.: 09/081,887

[22] Filed: May 19, 1998

[51] Int. Cl.$^7$ .............................. C08G 73/10; C08G 69/26
[52] U.S. Cl. ..................... 528/170; 528/310; 528/322; 528/331; 528/332; 528/335; 528/336; 528/339; 528/339.5
[58] Field of Search .................... 528/339.5, 332, 528/335, 339, 336, 331, 322, 310, 170

[56] References Cited

U.S. PATENT DOCUMENTS

| | | | |
|---|---|---|---|
| 2,860,113 | 11/1958 | Bolton et al. | 528/339.5 |
| 3,153,055 | 10/1964 | Brown et al. | 260/345.6 |
| 3,335,154 | 8/1967 | Smith | 260/345.6 |
| 3,507,890 | 4/1970 | Dieckelmann et al. | 260/407 |
| 4,341,670 | 7/1982 | Hinze et al. | 528/338 |
| 4,454,329 | 6/1984 | Takagi et al. | 549/413 |
| 4,514,540 | 4/1985 | Peck | 524/514 |
| 4,552,702 | 11/1985 | Schmid et al. | 260/428 |
| 4,613,410 | 9/1986 | Rivers, Jr. et al. | 203/39 |
| 4,650,611 | 3/1987 | Schmid | 260/410.9 |
| 4,895,982 | 1/1990 | Pavlin et al. | 562/595 |
| 4,973,743 | 11/1990 | Turner et al. | 502/202 |
| 5,126,429 | 6/1992 | Koehler et al. | 528/335 |
| 5,138,027 | 8/1992 | Van Beek | 528/339.3 |
| 5,162,490 | 11/1992 | Drawert et al. | 528/339.3 |
| 5,190,618 | 3/1993 | Top et al. | 203/34 |
| 5,214,124 | 5/1993 | Drawert et al. | 528/335 |
| 5,219,733 | 6/1993 | Myojo et al. | 435/52 |
| 5,315,020 | 5/1994 | Cheng et al. | 554/184 |
| 5,349,011 | 9/1994 | Reichert et al. | 528/272 |
| 5,371,245 | 12/1994 | Rindone et al. | 549/413 |
| 5,424,457 | 6/1995 | Sumner, Jr. et al. | 549/408 |
| 5,487,817 | 1/1996 | Fizet | 203/38 |
| 5,495,033 | 2/1996 | Basu et al. | 554/1 |

FOREIGN PATENT DOCUMENTS

| | | |
|---|---|---|
| 1008767 | 11/1965 | United Kingdom . |
| 1030514 | 5/1966 | United Kingdom . |
| 1159735 | 7/1969 | United Kingdom . |
| 2106100 | 4/1983 | United Kingdom . |

OTHER PUBLICATIONS

Ramamurthi, S. & McCurdy, A., "Enzymatic Pretreatment of Deodorizier Distillate for Concentration Sterols and Tocopherols", JAOCS, vol. 70, No. 3, (Mar., 1993), pp. 287–295.

Ghosh, S. & Bhattacharyya, D.K., "Isolation of Tocopherol and Sterol Concentrate from Sunflower Oil Deodorizer Distillate", JAOCS, vol. 73, No. 10, AOCS Press (1996), pp. 1271–1274.

*Primary Examiner*—P. Hampton-Hightower
*Attorney, Agent, or Firm*—Ernest G. Szoke; Wayne C. Jaeschke; Henry E. Millson, Jr.

[57] ABSTRACT

Process for the preparation of polyamides comprising the steps of

A) reacting a soybean oil condensate obtained from the deodorization of refined soybean oil and which contains less than 30% by weight of free and esterified oleic acid based on the total weight of free and esterified fatty acids in said condensate, with a $C_{1-4}$ alkanol in the presence of a zinc oxide catalyst to convert free fatty acids and fatty acid glyceride esters to fatty acid $C_{1-4}$ alkyl esters;

B) removing excess $C_{1-4}$ alkanol, volatile reaction by-products, water, and the zinc oxide catalyst from the resulting reaction mixture;

C) heating the reaction mixture from step B) under vacuum to obtain a distillate of fatty acid $C_{1-4}$ alkyl esters;

D) separating the distillate from step C) into a fraction containing mostly $C_{16-18}$ saturated fatty acid $C_{1-4}$ alkyl esters and a second fraction containing mostly $C_{16-18}$ unsaturated fatty acid $C_{1-4}$ alkyl esters wherein the oleic acid $C_{1-4}$ alkyl ester content is less than about 35% by weight thereof;

E) dimerizing said second fraction in the presence of montmorillonite clay; and

F) reacting the dimerized second fraction with a polyamine.

26 Claims, No Drawings

PROCESS FOR THE PREPARATION OF POLYAMIDES

FIELD OF THE INVENTION

This invention relates to polyamides and processes for their preparation.

BACKGROUND OF THE INVENTION

Certain processes for the preparation of polyamides are known to the art.

Polyamides are useful, inter alia, as a component of ink compositions, as curing agents for epoxy resins, as surface coating materials, and as sealants.

SUMMARY OF THE INVENTION

The present invention relates to a process for the preparation of polyamides from mixtures of dimeric fatty acid $C_{1-4}$alkyl esters obtained from soybean oil condensate resulting from the deodorization of refined soybean oil, wherein the condensate contains less than 30% by weight of free and esterified oleic acid based on the total weight of free and esterified fatty acids in the condensate.

DETAILED DESCRIPTION OF THE INVENTION

Other than in the operating examples, or where otherwise indicated, all numbers expressing quantities of ingredients or reaction conditions used herein are to be understood as modified in all instances by the term "about".

The process of the invention comprises the steps of

A) reacting a soybean oil condensate obtained from the deodorization of refined soybean oil and which contains less than 30% by weight of free and esterified oleic acid based on the total weight of free and esterified fatty acids in said condensate, with a $C_{1-4}$alkanol in the presence of a zinc oxide catalyst to convert free fatty acids and fatty acid sterol and glyceride esters to fatty acid $C_{1-4}$alkyl esters;

B) removing excess $C_{1-4}$alkanol, volatile reaction by-products, water, and the zinc oxide catalyst from the resulting reaction mixture;

C) heating the reaction mixture from step B) under vacuum to obtain fatty acid $C_{1-4}$alkyl esters and a residue;

D) separating the fatty acid $C_{1-4}$esters obtained from step C) into a first fraction containing a major amount of $C_{16-18}$saturated fatty acid $C_{1-4}$alkyl esters and a second fraction containing a major amount of $C_{16-18}$unsaturated fatty acid $C_{1-4}$alkyl esters in which the oleic acid $C_{1-4}$alkyl ester content is less than about 35% by weight thereof;

E) dimerizing the second fraction in the presence of montmorillonite clay to produce dimeric $C_{16-18}$fatty acid $C_{1-4}$alkyl esters; and F) reacting the dimeric $C_{16-18}$fatty acid $C_{1-4}$alkyl esters with at least one polyamine selected from alkylene diamines, alkylene triamines, alkylene tetraamines, alkylene pentamines, and alkylene hexamines.

The advantages for the present process include excellent color values of the polyamide products, faster removal of by-products, e.g. alkanols instead of water in step F), easy separation of unreacted monomers in step E), easy catalyst removal in step B), convenient handling and storage of reactants, efficient production of the polyamide products, readily available raw materials, and the convenient production of commercially valuable by-products.

Step A) can be carried out at a temperature in the range of from 100 to 250° C., preferably from 175 to 210° C., and more preferably from 180 to 200° C. with stirring in pressure equipment such as an autoclave for a period of from 1 to 5 hours, preferably from 1.5 to 2.5 hours, depending on the reaction temperature. Reaction pressures can range from 200 to 500 psig, preferably from 300 to 350 psig.

The ratio by weight of $C_{1-4}$alkanol to soybean oil concentrate is from 1:1 to 0.25:1, preferably from 0.75:1 to 0.4:1, and more preferably from 0.5:1 to 0.6:1. The zinc oxide catalyst is present in from 0.05% to 0.5%, preferably from 0.1 to 0.2% by weight, based on the weight of the soybean oil concentrate.

The soybean oil concentrate used in the present process is commercially available, and can be obtained by the steam deodorization of refined soybean oil, which can be either partially hydrogenated or non-hydrogenated.

The $C_{1-4}$alkanol can be methanol, ethanol, propanol, isopropyl alcohol, n-butanol, or isobutyl alcohol, but methanol is strongly preferred.

Step B) is carried out in a preferred method by cooling the reaction mixture from step A) to a temperature of from 50 to 100° C., preferably from 70 to 80° C., and then removing the excess alkanol, volatile by-products, and water by vacuum stripping. Zinc oxide is then removed, preferably by washing the resulting reaction mixture with dilute sulfuric acid, washing to neutral with water, and then vacuum drying. The resulting reaction mixture typically contains small quantities of free fatty acids, e.g. 3 to 5% based on the fatty acid ester content.

Step C) can be carried out by heating the reaction mixture, preferably to a temperature of 125 to 175° C., more preferably 150 to 160° C. under vacuum, e.g. from 1 to 4 Torr to obtain a distillate of fatty acid alkyl esters and a residue. The distillation is preferably carried out in a wiped film still.

In order to recover additional fatty acid alkyl esters, the residue can be treated in a continuous fractional distillation column equipped with a wiped film reboiler, using a pressure of 1–10 Torr, preferably 1–2 Torr, and a bottom plate temperature of 190–225° C., preferably about 200–210° C. The reboiler is operated at a temperature of from 200–250° C., preferably 210–230° C. Additional fatty acid alkyl esters are obtained as a distillate, with the residue being a tocopherol/sterol concentrate. The latter concentrate can be separated by known methods into its commercially valuable components.

The fatty acid alkyl esters obtained above are combined with the initially obtained distillate of fatty acid alkyl esters and used in step D).

Step D) can be carried out by fractionating the fatty acid alkyl esters under vacuum in a fractionating column to obtain a first distillate (fraction) containing a major amount (i.e. over 50%) of $C_{16-18}$saturated fatty acid $C_{1-4}$alkyl esters. The temperature in the fractionating column is preferably in the range of 165–200° C. at the top of the column, and 200–230° C. at the bottom of the column, using a vacuum of 1–20 Torr, preferably 3–15 Torr. The temperature and pressure will of course be somewhat dependent on the selection of the $C_{1-4}$alkyl group in the fatty acid esters.

The residue from the fractionating column is then distilled, preferably in a wiped film evaporator, to produce a second distillate (fraction) containing a major amount of $C_{16-18}$unsaturated fatty acid $C_{1-4}$alkyl esters, in which the oleic acid $C_{1-4}$alkyl ester content is less than 35% by weight based on the weight of the distillate. The temperature in the wiped film evaporator is preferably in the range of 200–225° C., with a pressure of from 1 to 5 Torr.

The first distillate can be further processed by sulfonation to give α-sulfoesters, useful as wash-active substances. The first distillate can also be used as a solvent for pesticides, as a synthetic lubricant, as leather fat liquor after transesterification with oils and fats, in the preparation of textile softeners by hydrogenation and transamidation, and in the preparation of ethoxylated alkyl esters by ethoxylation.

The second distillate is then dimerized in step E) in the presence of a montmorillonite clay, preferably in the further presence of a lithium compound such as lithium hydroxide or lithium octanoate, and hypophosphorous acid. The dimerization reaction is preferably carried out in an autoclave purged with an inert gas, conveniently nitrogen, at a temperature of from 240–300° C., preferably 240–285° C., and at a pressure of from 30–55 psig preferably from 40–50 psig. When the dimerization reaction is completed, usually after from about 1 to 5 hours, the reaction mixture is cooled to 140–170° C., preferably 150–160° C., and a mineral acid, preferably phosphoric acid, added to the reaction mixture. After stirring, the reaction mixture is filtered, distilled under vacuum, preferably in a wiped film still at a temperature of 240–280° C., preferably 250–265° C. and a pressure of from 1–25 Torr, preferably 10–12 Torr. The distillate comprises unreacted esters, which can be used as a textile softener or as a PVC lubricant.

The residue is the dimeric $C_{16-18}$ fatty acid $C_{1-4}$ alkyl esters.

Step F) is carried out by reacting the dimeric $C_{16-18}$ fatty acid $C_{1-4}$ alkyl esters from step E) with one or more polyamines at a temperature of 125–250° C., preferably 150–225° C. to produce the polyamides. The reaction proceeds well in the absence of any catalyst. The polyamines can be alkylene diamines, alkylene triamines, alkylene tetraamines, alkylene pentamines, and alkylene hexamines, e.g. ethylenediamine, diethylenetriamine, triethylenetetraamine, and pentaethylenehexamine. Generally, where the polyamides are to be used as curing agents for epoxy resins, an excess of polyamine is used. Where the polyamides are to be used as ink resins, approximately stoichiometric quantities of the ester and amine functionality are employed.

The invention will be illustrated but not limited by the following example.

EXAMPLE 100 kg of soybean oil distillate obtained as the condensate from steam deodorization of refined soybean oil having the following composition by weight:

43% free fatty acids

28% fatty acid glycerides 8.1% tocopherols 8.2% free sterols 2.9% sterol/fatty acid esters 1.0% water 8.8% other components, wherein the fatty acids present as free fatty acids, fatty acid glycerides, and fatty acid esters of sterols have the following distribution by weight:

| | |
|---|---|
| $C_{16:0}$ (palmitic) | 17.1% |
| $C_{18:0}$ (stearic) | 6.2% |

-continued

| | |
|---|---|
| $C_{18:1}$ (oleic) | 22.5% |
| $C_{18:2}$ (linoleic) | 36.0% |
| $C_{18:3}$ (linolenic) | 3.7% |
| Others | 14.5% | was added to an autoclave together with 50 kg of methanol and 0.1 kg of zinc oxide, and the resulting reaction mixture was heated with stirring to 180–200° C. and held at this temperature for 2 hours at a reaction pressure of 300–350 psig.

The reaction mixture was then cooled to 70–80° C. and excess methanol, volatile by-products, and water were removed by vacuum stripping. The residue was then washed with dilute sulfuric acid to remove the zinc oxide, washed until neutral with water, and vacuum dried. The residue contained from 3 to 5% free fatty acids based on the weight of the fatty acid methyl esters.

The vacuum dried residue was then fed to a wiped film still maintained at a temperature of 150–160° C. and 1–4 Torr pressure. About 35 kg of fatty acid methyl esters were obtained as a distillate. The remainder (65 kg) was fed to a continuous fractional distillation column, having 18 theoretical stages and having a bottom plate temperature of about 205° C., equipped with a wiped film reboiler. Pressure in the system was 1–2 Torr, with the reboiler maintained at a temperature of about 205° C. 35 kg of fatty acid methyl esters were obtained as a distillate, with 30 kg of tocopherol/sterol concentrate as residue. The fatty acid methyl esters were combined, and had essentially the same fatty acid distribution as in the soybean oil distillate starting material.

The combined fatty acid methyl esters (70 kg) was fed to a continuous 18 theoretical stage fractionating column operating at a reflux ratio of about 2.7. The pressure and temperature at the top and bottom of the column were about 173° C./3.5 Torr and 210° C./15 Torr respectively. The distillate (first fraction) from this column (18 kg) contained from 3 to 4% free fatty acid and had the following composition by weight:

| | |
|---|---|
| $C^*_{16:0}$ | 52.0% |
| $C_{18:0}$ | 1.5% |
| $C_{18:1}$ | 8.9% |
| $C_{18:2}$ | 15.5% |
| $C_{18:3}$ | 1.3% |
| Others | 20.8% |

*The designation $C_{16:0}$ and the like represents the number of carbon atoms for the number before the colon, and the number of double bonds for the number after the colon.

The residue (52 kg) from the fractionating column was fed to a wiped film evaporator operating at 2.0 Torr and 210° C. 47 kg of distillate (second fraction) was obtained, having 34% free fatty acids and having the following fatty acid distribution by weight:

| | |
|---|---|
| $C_{16:0}$ | 1.9% |
| $C_{18:0}$ | 8.7% |
| $C_{18:1}$ | 31.2% |
| $C_{18:2}$ | 49.4% |
| $C_{18:3}$ | 5.3% |
| Others | 3.5%. |

The entire procedure given above was repeated until at least 100 kg of the second fraction distillate was obtained.

A stirred autoclave was charged with 100 kg of the second fraction distillate, 10.67 kg of montmorillonite clay, 0.3 kg of lithium hydroxide monohydrate, and 0.166 kg of hypophosphorus acid. The autoclave was purged with nitrogen for 15 minutes, and then heated to 280° C. while maintaining a maximum pressure of 45 psig, and held at this temperature for 2 hours. The reaction mixture was then cooled to 150–160° C. and 5 kg of 75% phosphoric acid was added. The reaction mixture was stirred for one hour at 150–160° C. and filtered. The filtrate was distilled under vacuum in a wiped film still operated at 15 Torr and 258° C. 42.5% of the reaction mixture was obtained as a distillate (monomeric fatty acid methyl esters) having an acid value of 10.8 (5.4% free acid) and a saponification value of 184. The residue (57.5%) was dimeric fatty acid methyl esters (methyl dimerate), having a Gardner color of 5, an acid value of 29.5 (14.7% free acid), and a saponification value of 190.1.

57.5 kg of the dimeric fatty acid methyl esters (methyl dimerate) was reacted with 31 kg of triethylenetetraamine at a temperature of 205° C. for one hour to give 78.7 kg of the polyamide reaction product, having a Gardner color of 6.

What is claimed is:

1. A process for the preparation of polyamides comprising the steps of
   A) reacting a soybean oil condensate, derived from the deodorization of refined soybean oil, which contains less than 30% by weight of free and esterified oleic acid based on the total weight of free and esterified fatty acids in said condensate, with a $C_{1-4}$alkanol in the presence of a zinc oxide catalyst to convert free fatty acids and fatty acid sterol and glyceride esters to fatty acid $C_{1-4}$alkyl esters;
   B) removing excess $C_{1-4}$alkanol, volatile by-products, water, and the zinc oxide catalyst from the resulting reaction mixture;
   C) heating the reaction mixture from step B) under vacuum to obtain fatty acid $C_{1-4}$alkyl esters and a residue;
   D) separating the fatty acid $C_{1-4}$alkyl esters derived from step C) into a first fraction containing a major amount of $C_{16-18}$saturated fatty acid $C_{1-4}$alkyl esters and a second fraction containing a major amount of $C_{16-18}$unsaturated fatty acid $C_{1-4}$alkyl esters in which the oleic acid $C_{1-4}$alkyl aster content is less than about 35% by weight thereof;
   E) dimerizing said second fraction in the presence of montmorillonite clay to produce dimeric $C_{16-18}$fatty acid $C_{1-4}$alkyl esters; and
   F) reacting the dimeric $C_{16-18}$fatty acid $C_{1-4}$alkyl esters with at least one polyamine selected from the group consisting of alkylene diamines, alkylene triamines, alkylene tetraamines, alkylene pentamines, and alkylene hexamines.

2. The process of claim 1 wherein in step A) the soybean oil condensate contains less than 25% by weight of oleic acid.

3. The process of claim 1 wherein In step A) the ratio by weight of $C_{1-4}$alkanol to soybean oil condensate is from about 1:1 to about 0.25:1.

4. The process of claim 3 wherein said ratio is from about 0.75:1 to about 0.4:1.

5. The process of claim 1 wherein in step A) the $C_{1-4}$alkanol is methanol.

6. The process of claim 3 wherein in step A) the $C_{1-4}$alkanol is methanol.

7. The process of claim 1 wherein step A) is performed under pressure at a temperature in the range of from about 100 to about 250° C.

8. The process of claim 7 wherein said temperature is in the range of from about 175 to about 210° C.

9. The process of claim 1 wherein in step A) the zinc oxide catalyst is present in from about 0.05% to about 0.5%, based on the weight of the soybean oil condensate.

10. The process of claim 1 wherein in step B) excess $C_{1-4}$alkanol, volatile by-products, and water are removed under vacuum and the zinc oxide catalyst is removed by washing the reaction mixture with aqueous sulfuric acid.

11. The process of claim 1 wherein step C) is performed under vacuum at a temperature of from about 125 to about 175° C.

12. The process of claim 1 wherein step C) is performed in a wiped film still.

13. The process of claim 1 wherein in step C) said residue is distilled to obtain additional fatty acid $C_{1-4}$alkyl esters as a distillate.

14. The process of claim 1 wherein step D) is performed by fractionating the distillate from step C) under vacuum at a temperature of from about 165 to about 230° C. to obtain said first fraction and a residue.

15. The process of claim 14 wherein in step C) said residue is distilled under vacuum at a temperature in the range of from about 200 to about 225° C. to obtain said second fraction.

16. The process of claim 1 wherein in step E) a lithium compound is present in addition to the montmorillonite clay.

17. The process of claim 16 wherein hypophosphorus acid is also present in step E).

18. The process of claim 1 wherein step E) is performed at a temperature of from about 150 to about 290° C. in an inert atmosphere.

19. The process of claim 1 wherein in step E) the reaction mixture is distilled under vacuum at a temperature in the range of from about 240 to about 280° C. to remove and obtain monomeric esters as a distillate.

20. The process of claim 1 wherein step F) is performed at a temperature in the range of from about 125 to about 250° C.

21. The process of claim 20 wherein in step F) the at least one polyamine is selected from the group consisting of ethylene diamine, diethylene triamine, triethylene tetraamine, and pentaethylene hexamine.

22. A process for the preparation of a polyamide comprising the steps of
   A) reacting a soybean oil condensate, obtained from the deodorization of refined soybean oil, which contains less than 30% by weight of free and esterified oleic acid based on the total weight of free and esterified fatty acids in said condensate, with methanol in a ratio by weight of methanol to soybean oil condensate of from about 1:1 to about 0.25:1 in the presence of a zinc oxide catalyst at a temperature of from about 100 to about 250° C. to convert free fatty acids, fatty acid sterol esters and fatty acid glyceride esters to fatty acid methyl esters;
   B) removing excess methanol, volatile by-products, and water from the resulting reaction mixture by vacuum distillation, and removing the zinc oxide catalyst from the residue by washing with aqueous sulfuric acid;
   C) heating the washed residue from step B) under vacuum at a temperature of from about 125 to about 175° C. to obtain a distillate of fatty acid methyl esters and a residue, and distilling said residue at a temperature of from about 190 to about 225° C. under vacuum to obtain additional fatty acid methyl esters as the distillate;
   D) fractionating the combined distillates from step C) into a first fraction containing a major amount of $C_{16-}$ $_{18}$saturated fatty acid methyl esters and a second fraction containing a major amount of $C_{16-18}$ unsaturated fatty acid methyl esters in which the oleic acid methyl ester content is less than about 35% by weight thereof;

E) dimerizing said second fraction in the presence or montmorillonite clay to produce dimeric $C_{16-18}$ fatty acid methyl esters; and F) reacting the dimeric $C_{16-18}$ fatty acid methyl esters at a temperature in the range of from about 125 to about 250° C. with at least one polyamine selected from the group consisting of alkylene diamines, alkylene triamines, alkylene tetraamines, alkylene pentamines, and alkylene hexamines.

23. The process of claim 22 wherein in step F) the at least one polyamine is selected from the group consisting of ethylene diamine, diethylene triamine, triethylene tetraamine, and pentaethylene hexamine.

24. The process of claim 22 wherein in step A) the ratio by weight of methanol to soybean oil condensate is from about 0.75:1 to about 0.4:1. the reaction temperature is in the range of from about 175 to about 210° C., and the zinc oxide catalyst is present in from about 0.05% to about 0–5%, based on the weight of the soybean oil condensate.

25. The process of claim 22 wherein step D) is performed by fractionating the distillate from step C) under vacuum at a temperature of from about 165 to about 230° C. to obtain said first fraction and a residue, and distilling said residue under vacuum at a temperature in the range of from about 200 to about 225° C. to obtain said second fraction.

26. The process of claim 22 wherein in step E) a lithium compound is present in addition to the montmorillonite clay.

* * * * *